United States Patent [19]
McKinney

[11] 3,923,655
[45] Dec. 2, 1975

[54] LEVEL DETECTION SYSTEM

[75] Inventor: Ross E. McKinney, Lawrence, Kans.

[73] Assignee: Vesmat Investments, Inc., Fort Myers, Fla.

[22] Filed: Dec. 9, 1974

[21] Appl. No.: 530,705

[52] U.S. Cl. .................. 210/83; 210/86; 210/149
[51] Int. Cl.² .......................................... B01D 21/24
[58] Field of Search ............ 210/12, 63, 83, 84, 86, 210/96, 103, 104, 149

[56] References Cited
UNITED STATES PATENTS

| | | |
|---|---|---|
| 3,679,053 | 7/1972 | Koulovatos et al. ............ 210/104 X |
| 3,731,804 | 5/1973 | Kamajes et al. ................. 210/86 X |
| 3,788,472 | 1/1974 | Boschen et al. ................ 210/149 X |

Primary Examiner—John Adee

[57] ABSTRACT

A method and apparatus are provided for determining the sludge level in a secondary sedimentation tank of a sewage treatment system. The temperature differential between the sludge layer and the supernatant is used to detect the sludge level. Responsive to a differential temperature indicating a predetermined level of sludge in the tank, some of the sludge is wasted.

6 Claims, 7 Drawing Figures

LEVEL DETECTION SYSTEM

BACKGROUND OF THE INVENTION

1. Field of the Invention.

This invention relates to processes for the treatment of sewage, and more particularly relates to processes in which the sludge layer from a sedimentation tank is wasted responsive to a predetermined amount of sludge build-up.

2. Brief Description of the Prior Art.

It has been common in the past to monitor the conversion of sewage into a disposable effluent material by using turbidity meters. The turbidity meter is put on the effluent stream and monitors the amount of cloudiness or solids present in the effluent. However, by the time the turbidity meter has detected an over-abundance of solids in the effluent, the system is sufficiently out of balance that it cannot be corrected in time to prevent undue pollution in the effluent.

Recently Edmond A. Glos II, in a patent application entitled "Monitoring and Control of Biochemical Reactions", Ser. No. 447,835, filed Mar. 4, 1974, as a continuation-in-part of his application Ser. No. 267,190, filed June 28, 1972, which was in turn a continuation-in-part of his application Ser. No. 173,223, filed Aug. 19, 1971, has disclosed a process in which a temperature differential is detected in a biochemical reaction and especially in a sewage treatment plant to determine the biochemical activity for the purpose of controlling the biochemical reaction. As will be seen, the present invention is based upon and is an improvement upon the Glos principles.

SUMMARY OF THE INVENTION

The present invention provides a method and apparatus for detecting and controlling the level of sludge in a sedimentation tank of a sewage treatment system. The sludge is wasted from the tank responsive to detection of a predetermined sludge level within the tank. The sludge level is detected by detecting the temperature of the sludge and supernatant liquid to confirm an increase in the temperature of the sludge over that of the supernatant liquid. In a preferred form, a series of temperature probes are spaced in a sedimentation tank vertically to give a temperature profile of the tank, and an abrupt or sharp increase in the temperature is indicative of the level of the sludge layer. An increase in temperature in the range of about $0.01°-1.0°F$ and often about $0.3°F$. will exist between the supernatant liquid and the sludge layer, higher or lower temperatures may exist and can be detected. Also in the preferred form, once the sludge layer occupies about 10–20% by volume of the sedimentation tank, it is wasted responsive to the temperature differential.

While this invention is susceptible of embodiment in many different forms, there is shown in the drawings and will herein be described in detail a specific embodiment of the invention, with the understanding that the present disclosure is to be considered as an exemplification of the principles of the invention, and is not intended to limit the invention to the embodiments illustrated.

BRIEF DESCRIPTION OF THE PREFERRED EMBODIMENTS

Figure 1:
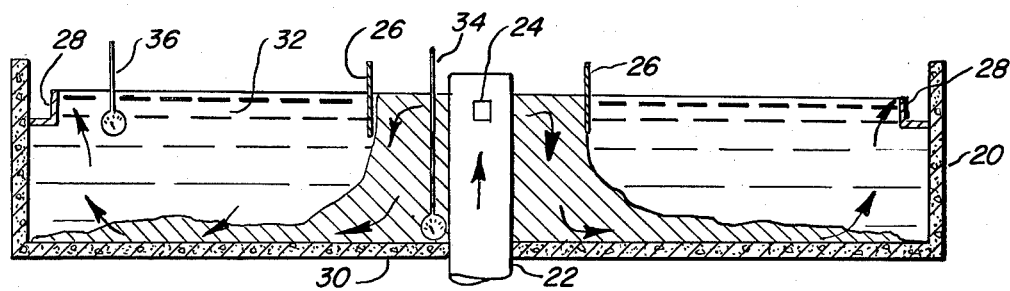
FIG. 1 is a schematic sectional diagram of a typical secondary sedimentation tank having a center inlet and a peripheral effluent weir discharge.

The preferred embodiments of the present invention are described with respect to an activated sludge system in which organic matter is oxidized by microorganisms in an aeration tank prior to secondary sedimentation for separation of sludge. Biochemical reactions occurring in the aeration tank generate heat, as is known from the patent application of Edmond A. Glos II, filed Mar. 4, 1974, as U.S. Ser. No. 447,835, entitled "Monitoring and Control of Biochemical Reactions". The Glos application is incorporated herein by reference as background information for the present invention.

In addition to the heat generated by the biochemical reaction in the aeration tank, the mechanical equipment used for aeration, mixing and/or agitation in the activated sludge of a sewage treatment system also generates heat. Normally the sewage together with activated sludge is discharged from the aeration tank to a secondary sedimentation tank where the sludge and supernatant is retained under quiescent conditions for a period of an hour or more. In the sedimentation tank lack of motion and the low metabolism of microorganisms in the activated sludge permit the liquid to lose some of its heat energy to atmosphere and to the ground around the tank. Thus, a temperature differential is established between the incoming activated sludge and the fluid near the surface of the sedimentation tank. Endogenous respiration by the microorganisms or microbials in the activated sludge will also release heat and create a temperature differential between the concentrated activated sludge layer adjacent the bottom of the tank and the settled supernatant less viscous liquid above the activated sludge in the tank. By the use of multiple probes spaced vertically within the tank for determining temperatures at various levels in the tank or by the use of a probe on a vertically movable line or gear strip or the like, it is possible to determine the vertical temperature differentials within the tank and to thereby locate the activated sludge layer which will show a sharp or marked temperature increase compared with the supernatant liquid.

Once the level of the activated sludge layer has been located, the operator of the waste-water treatment plant can determine whether or not he should increase or decrease the rate of activated sludge wastage. If an overage of activated sludge is present within the sedimentation tank, it will be wasted. Conversely, if the activated sludge layer is less than normal or than desired in proper operation, the activated sludge can be retained within the sedimentation tank until the layer is built up to the proper level.

As the sludge layer increases beyond a specific predetermined level for a specific or definite mixed liquor suspended solids concentration and rate of hydraulic flow, the sludge wasting rate would be increased again by the operator. Failure of the sludge layer to rise to the specific desired level would result in the operator decreasing sludge wasting until the production of excess activated sludge catches up with the desired level.

The detection system of the present invention can be used to automatically control the sludge level responsive to detection of temperature differentials which are read out as a detection of the upper limit of the sludge layer.

Usually a properly operating activated sludge system will have a specific or definite range of sludge blanket variation during the normal 24 hour operational cycle, with the sludge blanket level being at a minimum during the nighttime low flow conditions and at a maximum during the daytime peak flow conditions. The activated sludge blanket would normally be kept below the maximum level to prevent excess solids loss and increased pollution in the stream which receives the effluent from the sewage treatment system. Operation at a lower than maximum sludge level also gives leeway to the possibility of a sudden increase in sludge.

From the secondary sedimentation tank or tanks the supernatant is removed as effluent for discharge to natural streams or the like, while the sludge layer is discharged for delivery to sludge digesters which complete the microbial process before the sludge is removed and used for fertilizer or other applications. The sludge removal from the sedimentation tank to the digesters can be controlled automatically responsive to the temperature differential detected within the sedimentation tanks.

Turning now to the drawings, FIG. 1 illustrates a typical secondary sedimentation tank which can be used in accordance with the present invention. The principle of operation of the tank involves a hydraulic current of mixed liquor which flows into the tank 20 from the influent line 22 through an inlet port or ports 24. A circular baffle 26 is provided spaced from the inlet ports 24 so that the influent is directed downwardly into the tank 20 with the effluent flowing over a circular peripheral weir 28. The solids settle as indicated at 30. The supernatant liquid at 32 flowing over the weir 28 is eventually discharged to a stream or the like.

In accordance with the present invention a first temperature probe is positioned at 34 within the settled sludge or solids while a second temperature probe is positioned in the supernatant liquid as at 36. The temperatures are measured and an increase in the temperature at probe 34 relative to the temperature at probe 36 indicates a sludge build-up within the sedimentation tank, and further indicates to the treatment plant operator that sludge should be wasted or withdrawn from the tank.

In a sedimentation tank, the activated sludge forms a definite layer which is distinct from the supernatant liquid above the sludge. The activated sludge within the tank is usually retained only for a short period of time before it is periodically or gradually and continuously wasted and/or recycled to the aeration tank. The short retention of the activated sludge layer and the long retention of the supernatant liquid above the sludge layer results in a sharper or more definitive temperature differential which is easily detected by sensitive temperature probes 34 and 36.

Figure 2:
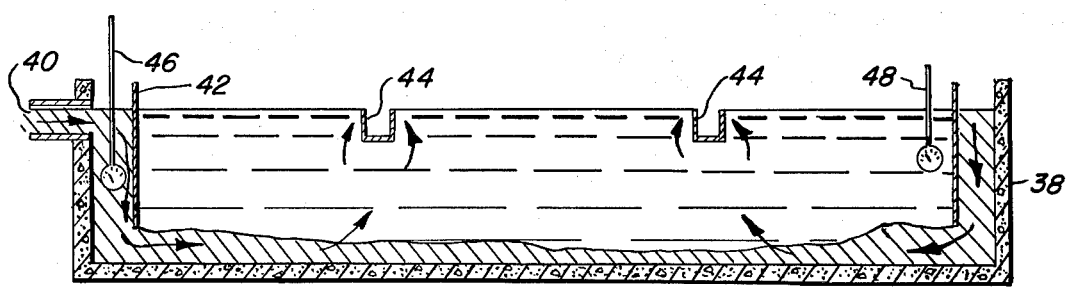
FIG. 2 is a schematic sectional diagram of a typical secondary sedimentation tank having a peripheral inlet and an abcentral effluent weir discharge.

Turning now to FIG. 2, there is shown another common secondary sedimentation tank system. This system involves peripheral feed of influent through an influent inlet line 40 with, again, a circular baffle 42 directing the influent initially toward the bottom of the tank. The effluent weir is in the form of a ring-like baffle at 44, the effluent liquid flowing into the weir for discharge from the sedimentation tank. Temperature probes are provided at 46 and 48 in the settled solids and supernatant liquid respectively, so that a temperature differential can be determined for the purpose of detecting sludge build-up within the sedimentation tank 38. It is to be understood in the examples described herein that although a temperature differential is taken between the settled sludge layer and the supernatant liquid, the temperature of the sludge layer alone, plotted against a previously established temperature profile of the sludge layer in a given sedimentation tank of a sewage treatment process, can be used for detecting the sludge layer level.

The examples given herein are for the purpose of illustrating the present invention and are not intended to be limitations thereon.

EXAMPLE I

Figure 3:
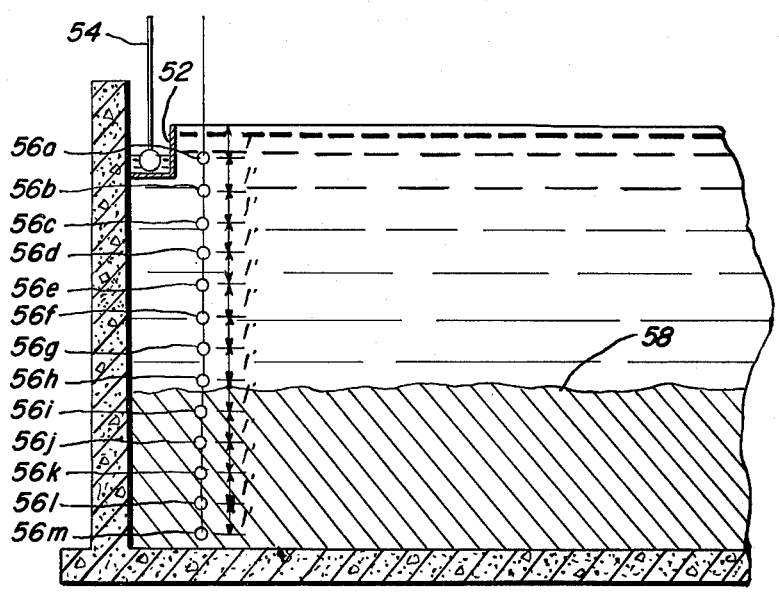
FIG. 3 is a diagrammatic showing of a cross-section through a secondary sedimentation tank showing the location of temperature measurements used in accordance with one form of the present invention.

Turning now to FIG. 3, there is shown a typical sedimentation tank 50 having an effluent weir at 52 and a single temperature probe as a reference located in the effluent channel or ring at 54. The probe 54 could be located near the influent baffle for convenience or it could be located anywhere near the surface of the sedimentation tank fluid, e.g., approximately one to two feet below the fluid surface, at a point which is relatively non-turbulent or undisturbed. The purpose of the reference probe is to furnish temperature which varies with the normal tank fluid temperature without any suspended solid concentrations of significance present in the area of location of the probe.

A series of other temperature probes 56a through 56m are provided spaced vertically one foot from each other for detection of temperatures within the settled solids and clarified or supernatant fluid within tank 50. The interface between the settled solids and the clarified fluid is depicted at 58 and is detected by a sharp temperature differential between the clarified fluid and the settled solids, in this instance between detectors 56h and 56i. Once the level of the settled solids or sludge has been determined by the temperature detectors, the plant operator can decide whether or not wasting of sludge is appropriate at a given time.

Figure 4:
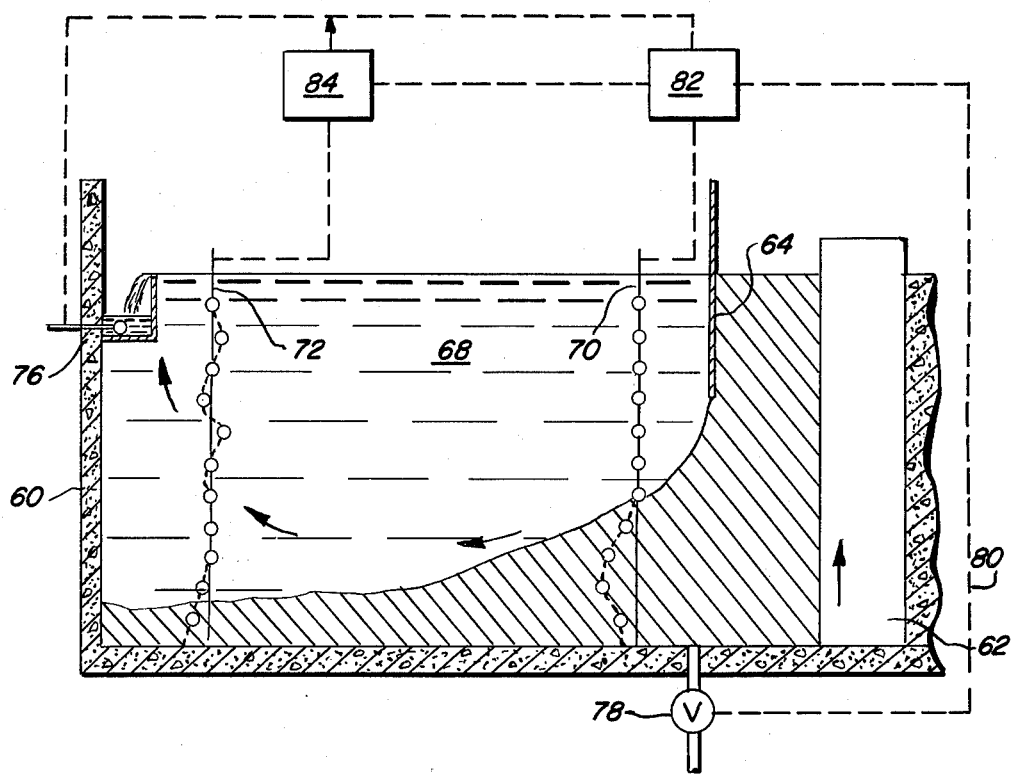
FIG. 4 is a diagrammatic showing of temperature differential measurements in a center inlet sedimentation tank used in experiments conducted according to the present invention, and showing a sludge discharge system controlled by the temperature differential between the supernatant liquid and the sludge within the tank.

Referring now to FIG. 4, there is illustrated a system in which typical data can be collected for a center inlet sedimentation tank 60. The influent inlet is indicated at 62 and the influent sewage is directed downwardly by a baffle at 64 with settled sludge accumulating at 66 and clarified fluid at 68. Two vertically spaced series of temperature probes are shown at 70 and 72 with temperature differences depicted diagrammatically with increased temperatures shown by spacing of the probe dots to the left of the centerlines of each series and decreased temperatures shown by spacing of the probe dots to the right of the centerline. It will be seen that the settled sludge shows a definite increase in temperature compared with the temperature of the supernatant material. The supernatant material overflows for discharge at weir 74, and a reference temperature probe 76 is provided within the discharge system.

A valved outlet line 78 is provided, controlled through suitable control lines 80 by temperature comparison devices 82 and 84 which receive signals from the arrays of probes 70 and 72 and the reference probe 76.

Figure 5:
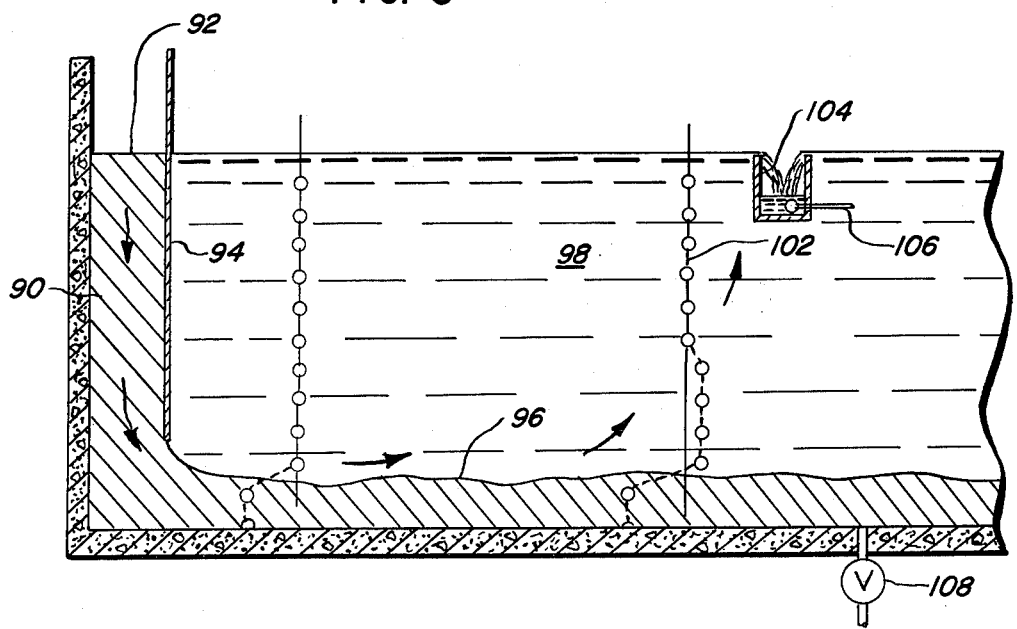
FIG. 5 is a diagrammatic showing of temperature differential measurements in a periphery inlet sedimentation tank.

Turning now to FIG. 5, there is illustraed a diagrammatic and schematic cross-sectional showing of another sedimentation tank particularly depicting the inlet system, the outlet or effluent system, and the vertically spaced temperature probes. As can readily be seen, the tank 90 has an influent chamber 92 with a peripheral baffle 94 for directing the influent downwardly into the tank. The solids settle as at 96 with clarified liquid or fluid as the supernatant at 98. A first temperature differential is taken by the string of probes shown at 100 adajcent the inlet, and a second temperature differential is taken by the string of probes 102 adjacent the outlet. In addition, at the effluent or outlet weir 104 there is a reference probe 106. Again, the individual probes of the strings 100 and 102 are offset to show the temperature differential at the two particular points within this specific sedimentation tank. A deviation to the left of the centerline indicates an increase in temperature while a deviation to the right indicates a decrease in temperature. It will be noted that at both positions 100 and 102 within the tank 90, the temperature in the settled solids increases markedly over that in the supernatant liquid showing accumulation of settled solids in the tank. Again, in each string of temperature probes the probes are spaced one foot apart so that the sharp deviation to an increased temperature at the bottom two probes in each instance indicates an accumulation of between one and two feet of sludge in the tank. In this case as in all others where the bottom of the tank is exposed to atmospheric conditions or to ground temperature, e.g., by a foundation resting directly on the ground, any temperature probe positioned at and against the very bottom of the tank will reflect external conditions such as ground temperature, and temperature readings from such a probe can be discarded.

EXAMPLE II

Figure 6:
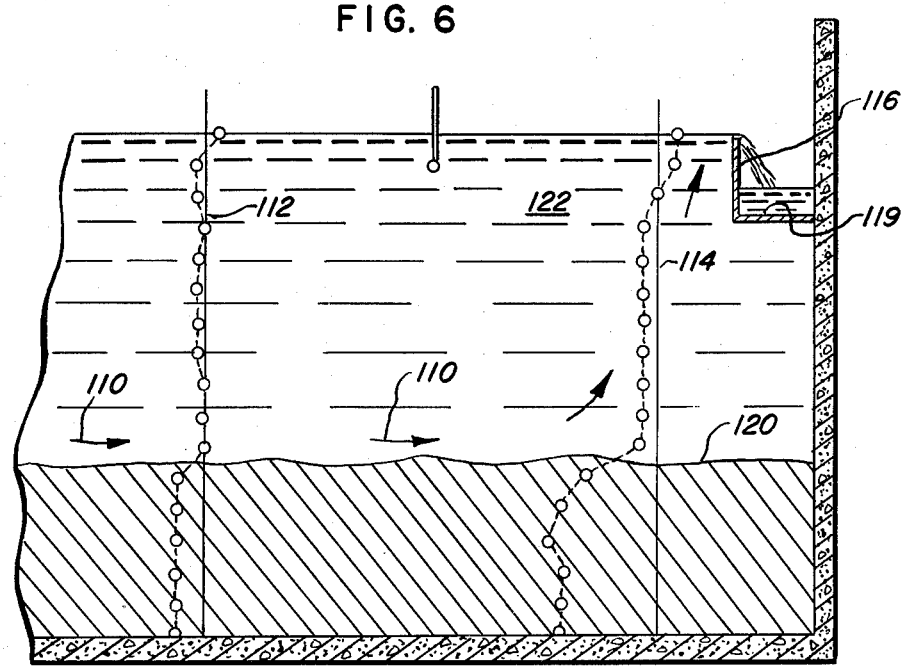
FIG. 6 is a diagrammatic showing of temperature differential measurements in another sedimentation tank, again indicating the temperature increase in the settled solids within the tank.

FIG. 6 shows the results of operation of a secondary sedimentation tank in another location. This tank had a depth of sixteen feet, and during operation a generally meaningless temperature differential developed near the surface of the tank as a result of atmospheric conditions. However, a meaningful temperature change developed between 10 and 11 foot depths in the tank where the sludge blanket was located. In tests conducted with this tank it was determined that the important parameter was not the magnitude of the temperature or the magnitude of the temperature differential, but rather was the mere presence of the temperature differential which indicated the presence of the sludge level.

In the tank as illustrated, sewage was fed in through an inlet in the direction indicated by the arrows 110. The tank was monitored by two strings of thermocouples spaced vertically about one foot apart as indicated at 112 and 114. Effluent was recovered from the tank over a weir at 116 into a trough 118 for delivery to a pond, stream or the like. The sludge solids settled at 120 while the supernatant or clarified fluid occupied the upper portion of the tank at 122. Again, the differential temperature throughout the depth of the tank is illustrated by the displacement of the probe dots of strings 112 and 114 to the left for an increased temperature and to the right of the centerline for a decreased temperature. Again, the sludge level was accurately detected.

EXAMPLE III

The above examples and descriptions were a result of actual field data for establishing the practical concepts of the invention. In addition, laboratory studies have been made with small scale activated sludge systems to further demonstrate changes which occur within the sludge blanket and the surrounding or supernatant liquid. The laboratory activated sludge units consisted of a two-liter aeration tank and a one-liter sedimentation tank. The activated sludge in the aeration tank was maintained in suspension by compressed air blown through a porous stone diffuser at a low rate.

Soluble organic wastes were pumped through the aeration tank to supply the microorganisms with food for metabolism at a concentration of 250 mg/1 to simulate normal domestic sewage. The pumping of the soluble organic wastes caused displacement of the activated sludge which was forming in the aeration tank to the sedimentation tank where quiescent conditions permitted the activated sludge to separate from the supernatant liquid and to concentrate at the bottom of the sedimentation tank as occurred in fields units.

The clarified or supernatant liquor was withdrawn from the top of the sedimentation tank and discharged as treated waste-water bank into the environment. The accumulated activated sludge which settled as a blanket in the bottom of the sedimentation tank was continuously recycled back to the aeration tank for inoculating the tank and insuring a continuous supply of activated sludge for proper operation of the treatment process, in the normal manner.

The laboratory activated sludge system operated in the same manner as the system operated in the field unit. A definite sludge blanket occurred in the sedimentation tank. The reference temperature probe (P1) was located in the aeration tank, and a movable probe (P2) was also employed in the tank. Probe P2 was moved from the bottom to the top of the tank, while the probe P1 was maintained stationary near the top of the tank. The temperature differential between the two probes was taken as an indication of the sludge level in the tank, and the detection of the sludge level was verified by visual observation.

Prior to taking a temperature differential, the two probes were initially placed at the top of the aeration tank and calibrated for a zero differential to insure stability of the apparatus in further measurement of temperature differentials at various levels. The probe P2 was moved to the sedimentation tank and immersed to a level just above the sludge blanket. The fluid just above the sludge blanket indicated a slightly warmer temperature than the reference probe P1 in the aeration tank. Additional activated sludge was added to the system to produce a temperature rise in the sludge blanket above the level of the P2 probe temperature. The temperature differential showed a sharp increase in probe P2 over probe P1. A slow increase in temperature differential occurred as a result of heat released by metabolism within the sludge blanket. As the system reestablished normal solids concentration, the sludge blanket dropped below the level of the temperature probe P2, resulting in a sharp and immediate drop in temperature differential. As additional sludge accumulated in the sedimentation tank, the temperature of probe P2 increased and the temperature differential rose sharply and immediately.

The data from the laboratory tests demonstrated that the temperature differential was created by the action of the microorganisms in the activated sludge relative to the activity in the aeration tank. When the temperature differential is measured, a positive temperature differential was produced. The fluid flow in the sludge blanket prevented loss of heat released by microbial metabolism and allowed the released heat to be measured by probe P2. While the rate of metabolism and heat release was greater in the aeration tank than in the sludge blanket, the aeration mixing resulted in loss of excess heat to the outside environment and prevented the heat increase in the aeration tank. Moving the probe out of the sludge blanket in the sedimentation tank produced a sharp decrease in temperature differential which clearly indicated that the temperature differential was a measure of the level of the sludge blanket in the sedimentation tank.

Figure 7:
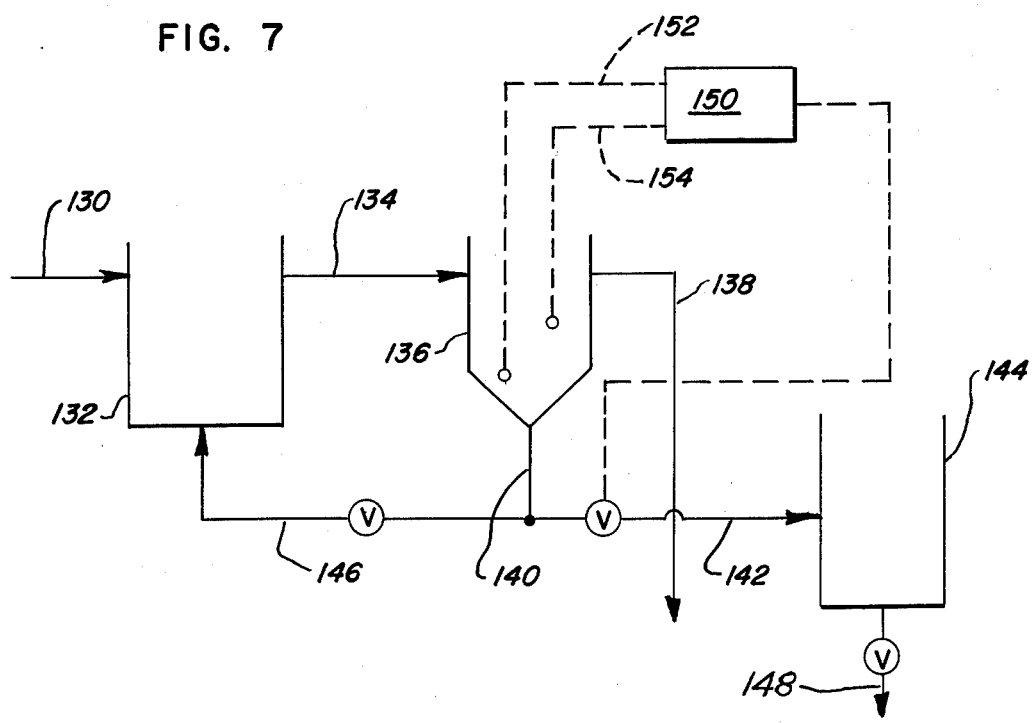
FIG. 7 is a generalized overall flow scheme depicting a sewage treatment plant embodying the present invention.

Turning now to FIG. 7, there is shown a diagrammatic overall flow system for a sewage treatment plant embodying the principles of the present invention. In operation of the sewage treatment process, sewage is fed as influent through line 130 into an aeration zone 132. Normally there will be a plurality of aeration tanks in series and/or parallel, making up the aeration zone 132. Air is fed to the aeration zone to maintain the aerobic treatment of the sewage by microorganisms. Aerated and digested sewage is recovered through line 134 and delivered to a settling tank 136.

Again, the settling tank may be a series of units in parallel or series. The sewage is permitted to settle in the settling tank 136 and the effluent or supernatant liquid is recovered through line 138 for discharge to the environment. Sludge from tank 136 is recovered through line 140 and delivered either through line 142 to sludge digester 144 or through line 146 for recycle to the aeration zone to provide inoculation of the sewage in aeration zone 132 with activated sludge.

The recycle and wasting of sludge are controlled in the normal manner. From sludge digester 144 sludge can be dumped or wasted through the valved outlet line 148. A temperature comparitor 150 compares the temperature of the sludge blanket and the supernatant liquid in settling tank 136 and controls the valve lines 142 and 146 to waste or recycle sludge as sludge builds up in settling tank 136 beyond the desired level. Thus, the system can be controlled automatically responsive to the sludge level with little or no attention from the operator.

In the above described sewage treatment plants of FIGS. 4 through 6, when running the above specific Examples I and II, the plants were operated under normal operation conditions. For example, in the system of FIG. 4, aerated sewage was fed through inlet 62 at the normal daily rate. The discharge at weir 74 was at a slightly lower rate because of wasting of sludge from the tank 60 through outlet 78. The valved outlet 78 was controlled by units 82 and 84 to waste sludge whenever a sharp temperature differential of a few hundredths or tenths degrees F. indicated a sludge level in the bottom of tank 60 at about five and two feet respectively detected by the lines of temperature probes 70 and 72.

The principles of the present invention are applicable to any microbial process in which a sludge layer is produced by microbial action, whether it be by bacteria, yeast, enzymes, or the like.

The foregoing detailed description has been given for clearness of understanding only, and no unnecessary limitations should be understood therefrom as some modifications will be obvious to those skilled in the art.

I claim:

1. Method for detecting the level of sludge in a sedimentation zone of a sewage treatment process, which method comprises measuring (1) a first temperature within the sludge layer in the sedimentation zone, and (2) a second temperature within the supernatant liquid above such sludge layer at a point spaced from such first temperature, and comparing the two temperatures to determine a temperature differential therebetween indicative of the upper portion of the sludge level between the two points.

2. The method of claim 1 wherein sewage is continuously flowed through the sedimentation zone and sludge and supernatant liquid are continuously withdrawn therefrom.

3. The method of claim 1 including the step of wasting sludge responsive to the detected sludge level.

4. A method for detecting the level of activated sludge in a secondary sedimentation zone in a sewage treatment process, which method comprises measuring the temperature of the lower activated sludge layer in said sludge zone and the temperature of the supernatant liquid above such activated sludge layer, determining a sharp increase in temperature of said activated sludge over the temperature of said supernatant liquid, whereby the depth of the activated sludge layer is also determined as a result of the temperature differential, and wasting activated sludge responsive to said determination to maintain a controlled level of activated sludge in said zone.

5. The method of claim 4 in which temperatures are taken in the supernatant liquid and activated sludge each in a plurality of vertically spaced positions.

6. The method of claim 4 in which the activated sludge is wasted from said zone responsive to an accumulation of the depth of at least 0.05% of the volume of said zone.

* * * * *